March 10, 1959     E. S. SPORKLAND     2,876,520
SAFETY-TYPE SNAP FASTENER
Filed March 2, 1954
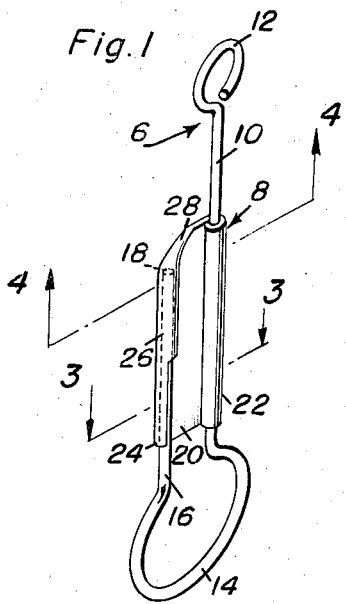
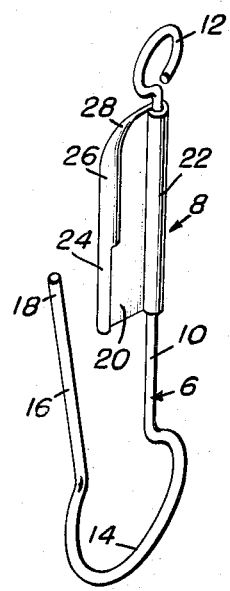
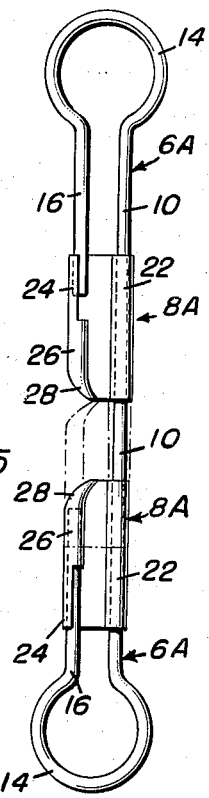
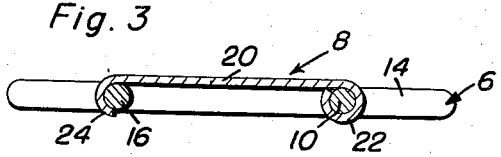
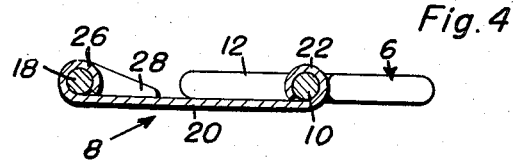
Erik S. Sporkland
INVENTOR.
BY Clarence A. O'Brien
and Harvey B. Jacobson
Attorneys

United States Patent Office 2,876,520
Patented Mar. 10, 1959

2,876,520

SAFETY-TYPE SNAP FASTENER

Erik S. Sporkland, Everett, Wash.

Application March 2, 1954, Serial No. 413,600

1 Claim. (Cl. 24—236)

This invention relates to fasteners, generally speaking, and has more specific reference to a category thereunder most frequently referred to as snap fasteners, particularly that style which is characterized by a guard which is not only slidably mounted but is, in addition, pivotally mounted.

Snap fasteners, as they are generally called, are used for many and variable purposes and consequently, the instant invention is to be broadly construed, since it may be made small or large and used as a key or key chain holder, as a safety pin, general utility clasp for use by a fisherman and others, and so on. As will be clear, therefore, the invention has to do with a multipurpose fastener which is an innovation because of the unique structural designing and functioning of the components thereof, particularly the construction of the pivoted sliding keeper-equipped guard.

Other objects, features and advantages will become more readily apparent from the following description and the accompanying sheet of drawings.

In the drawings, wherein like numerals are employed to designate like parts throughout the same:

Figure 1 is a perspective view of a snap fastener or clasp constructed in accordance with the principles of the present invention, illustrating the construction of the parts and showing the guard in its safety-closing position;

Figure 2 is a perspective view based on Figure 1 with the free pin portion open or unsnapped;

Figure 3 is an enlarged section taken on the horizontal line 3—3 of Figure 1, looking in the direction of the arrows;

Figure 4 is a similar exaggerated or enlarged section which is taken on the line 4—4 of Figure 1 and which is drawn as it appears in the direction of the arrows; and Figure 5 is an elevational view of a dual type snap fastener, that is, a fastener construction which is basically or fundamentally the same as the single type and wherein the features of the single type are merely duplicated at the respective ends of the structure.

The over-all fastener or snap hook comprises a single length of resilient wire the components of which lie wholly in one plane, said wire having a linearly straight portion defining a shank 10. One end of the wire terminates in a substantially annular portion integral with one end of the shank and this arrangement provides an eye 12 and also a shoulder. The opposite end portion of wire is characterized by a hook including a rounded resilient loop 14 which curves from the opposite end of the shank 10 through an arc less than a complete circle and yet exceedingly 180 degrees. The end portion of the curved loop terminates in a linearly straight bill 16 shorter than the shank 10 and normally urged outwardly of the inherent resilient properties of the loop so as to extend in a hook open position at an acute angle to the longitudinal axis of the shank 10. The bill portion is swingable inwardly to a hook-closing-position in which position it is parallel to the shank 10 as seen in Fig. 1. A permanently attached guard 8 is provided and the guard comprises a rigid plate 20 having a sleeve 22 on one edge, said sleeve slidingly and rotatably embracing the shank 10 and a bill keeper which extends throughout the opposite edge of the plate and comprises an open bill receiving seat 24 and an aligned closed bill receiving and retaining socket 26. It will be noticed that the sum of the lengths of the keeper and bill portion are actually greater than the over-all length of the shank 10. The plate portion 26 between the edges is planar and of a width sufficient to bridge the space between the bill 16 and the shank 10 when the bill 16 assumes the aforementioned hook-closing position when it extends parallel to the shank. The guard 8 is slidably away from the loop 14 to a position in substantial contact with the shoulder for receiving the free end of said bill in the seat. It is subsequently slidable toward the loop 14 to a position so that the free end is frictionally retained in said socket for latching the same in hook-closing position. The guard 8 is rotatable toward and away from the bill to facilitate engagement and disengagement of the free end of the seat in preparation to latching and unlatching the hook.

With reference now to the modification appearing in Figure 5, this, as before stated, is a duplex or dual type snap fastener. In other words, the construction is the same at both ends, which means that corresponding portions or features of the structure seen in Figures 1 to 4, inclusive, are merely duplicated. For convenience of description, the same numerals will be employed to designate corresponding parts of the duplicated end constructions. All that is necessary to distinguish the embodiment of the invention is to point out that the respective wire clasp portions are denoted by the reference characters 6A, while the slidable and swingable guards or keepers are respectively denoted by the numerals 8A. Otherwise, the other parts are the same. It will be noticed, however, that the two shanks 10 are in axial alignment and that there is, of course, no eye 12 needed in this form of the invention.

From the foregoing, the construction and operation of the device will be readily understood and further explanation is believed to be unnecessary. However, since numerous modificaitons and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A snap hook comprising a single length of resilient wire lying wholly in one plane and having a linearly straight portion defining a shank, one end of said wire terminating in a substantially annular portion integral with one end of said shank to provide an eye and a shoulder, the opposite end portion of said wire comprising a hook including a rounded resilient loop curving from the opposite end of said shank through an arc less than a complete circle and exceeding 180 degrees, and terminating in a linearly straight bill shorter than said shank but of substantial length, said bill being normally urged outwardly by said resilient loop to extend in a hook open position at an acute angle to the longitudinal axis of said shank portion, and being swingable inwardly to a hook closing position parallel to said shank, a permanently attached guard comprising a rigid plate having a sleeve on one edge slidably and rotatably embracing said shank and a bill keeper extending throughout the opposite edge of said plate comprising an open bill receiving seat and an aligned closed bill retaining socket, the sum of the lengths of said keeper and said bill portion being greater than the length of said shank, the portion of said plate between said edges being planar and of a width sufficient to bridge the space between said bill and shank when said bill assumes said hook closing position extending parallel to said shank, said guard being slidable away from said loop to a position in substantial contact with said shoulder for receiving the free end of said bill in said seat, and being subsequently slidable toward said loop to a position whereby said free end is frictionally retained in said socket for latching the same in hook closing position, said guard being rotatable toward and away from said bill to facilitate engagement and disengagement of said free end with said seat in preparation to latching and unlatching the hook.

References Cited in the file of this patent

UNITED STATES PATENTS

| | | |
|---|---|---|
| 354,830 | Freeman | Dec. 21, 1886 |
| 905,731 | Merrill | Dec. 1, 1908 |
| 1,038,202 | Reynolds | Sept. 10, 1912 |
| 1,182,471 | Frost | May 9, 1916 |
| 1,360,794 | Ralph | Nov. 30, 1920 |
| 1,447,429 | Reimers | Mar. 6, 1923 |
| 1,461,246 | Lent | July 10, 1923 |
| 2,605,632 | Lamonde | Aug. 5, 1952 |
| 2,676,380 | Lindquist | Apr. 27, 1954 |

FOREIGN PATENTS

| | | |
|---|---|---|
| 542,948 | France | May 24, 1922 |